No. 657,200. Patented Sept. 4, 1900.
C. H. MELVIN.
ROLLING COLTER.
(Application filed June 12, 1900.)
(No Model.)
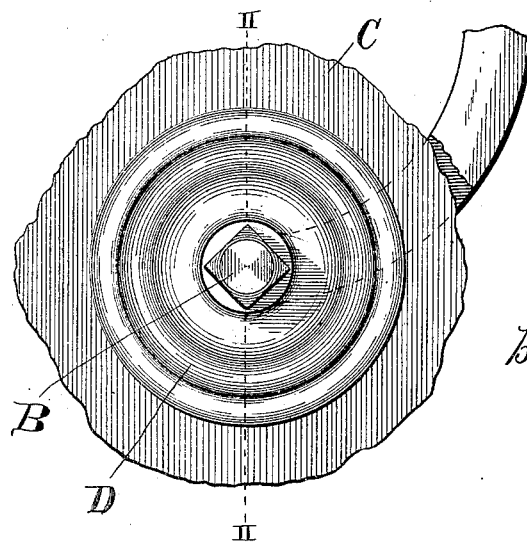
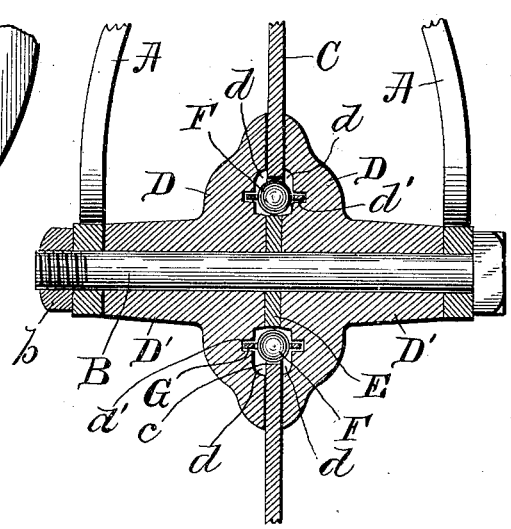
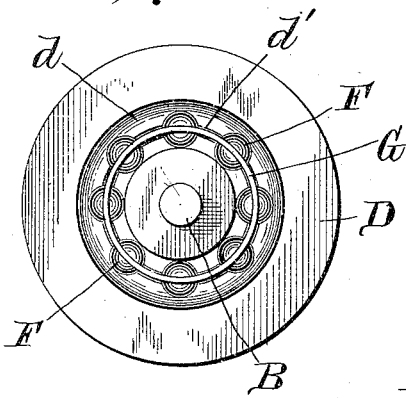
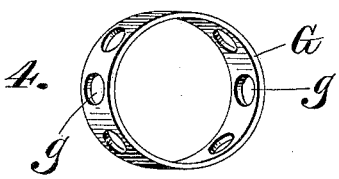
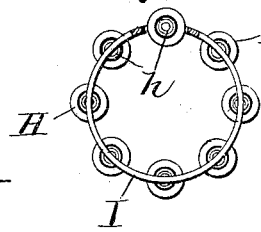
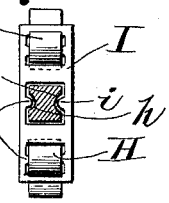
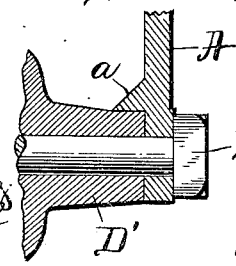
Witnesses
Inventor
Charles H. Melvin
His Attorney
THE NORRIS PETERS CO., PHOTO-LITHO., WASHINGTON, D. C.

UNITED STATES PATENT OFFICE.

CHARLES H. MELVIN, OF MOLINE, ILLINOIS, ASSIGNOR TO THE DEERE & COMPANY, OF SAME PLACE.

ROLLING COLTER.

SPECIFICATION forming part of Letters Patent No. 657,200, dated September 4, 1900.

Application filed June 12, 1900. Serial No. 20,047. (No model.)

*To all whom it may concern:*

Be it known that I, CHARLES H. MELVIN, a citizen of the United States, residing at Moline, in the county of Rock Island and State of Illinois, have invented certain new and useful Improvements in Rolling Colters; and I do hereby declare the following to be a full, clear, and exact description of the invention, such as will enable others skilled in the art to which it appertains to make and use the same.

This invention relates to improvements in rolling colters for plows.

The primary object of the invention is to produce a light-running rolling colter with ball-bearings and a non-rotating hub, so as to effectually exclude dirt and dust from the bearings and prevent grass and weeds from being wrapped around the hub or bearings and consequent clogging of the colter.

Further objects are to provide a simple, efficient, and inexpensive ball or roller bearing for rolling colters, whereby the colter-blade or cutting-disk may rotate on the smallest possible bearing-surface, thus reducing the friction to a minimum, and to provide simple and efficient means for mounting the colter-blade or cutting-disk between the arms of the supporting-yoke and sustaining it in proper operative position, while at the same time allowing free rotation thereof.

The invention will first be hereinafter more particularly described with reference to the accompanying drawings, which form a part of this specification, and then pointed out in the claims at the end of the description.

In said drawings, in which similar letters of reference are used to denote corresponding parts in the different views, Figure 1 represents a side elevation of a rolling colter embodying my invention, the cutting edge or periphery of the colter-blade or cutting-disk being broken away. Fig. 2 is a section of the same, the section being taken on line II II of Fig. 1. Fig. 3 is a detail view of the inner face or end of one of the disk-like parts which secure the colter-blade in position, the arrangement of the antifriction-balls around the bearing-ring being also shown. Fig. 4 is a detail perspective view of a ball-spacing ring, and Figs. 5 and 6 are detail views showing a modified form of antifriction devices and retaining-ring therefor. Fig. 7 is a detail sectional view illustrating a simple contrivance for preventing the hub from turning.

Referring to the drawings by letters of reference, the letters A A denote the arms of a suitable yoke for supporting the rolling colter, having their lower ends suitably apertured to receive a bolt B, which supports and secures the cutting-disk and its adjacent parts between the arms of the yoke.

The letter C denotes the cutting-disk or circular colter-blade, which is provided with a central aperture *c* to receive the bearings. The cutting-disk is rotatably secured between the confronting faces of two disk-like parts or castings D D, which are non-rotatably secured between the arms A A of the supporting-yoke, said disk-like parts being preferably formed with central bosses or hub-like portions D' D', extending to said arms. A suitable bearing ring or annulus E of the required diameter may be interposed between the disk-like parts D D, within the central aperture *c* of the cutting-disk, and the said cutting-disk is journaled on said bearing ring or annulus, preferably through the medium of suitable antifriction devices, such as balls or rollers. The said bearing-ring is of the required width or thickness to separate the disk-like parts D D, just enough to allow free rotation between their confronting faces of the cutting-disk C without permitting undue lateral play thereof or the entrance of dirt between said parts and the sides of the disk. The parts D D thus sustain the disk against lateral movement while permitting free rotation thereof on its bearings, and said parts D D also serve as a dust-guard or cover to prevent the admission of dust to the bearings of the disk. The bearing-ring E may of course be formed integrally with one of the parts D, if desired, or may be constituted by confronting projections on both of said parts, but is preferably a separate part to adapt it to be removed and replaced when worn. The said bearing-ring E and disk-like parts D D are also suitably apertured to receive the bolt B, which is provided on its protruding end with suitable fastening means, as the nut *b*, whereby said parts are clamped and secured between the arms of the yoke. If desired, the apertures through the disk-like parts or hub portions D and the yoke-arms A may be square or polygonal to receive a correspondingly-shaped fastening-bolt, though under ordinary usage the hub-like parts between which the rotary cutter is confined may be held against rotation by simply clamping them tightly between the yoke-arms, as shown, or by a lug $a$ on the yoke-arm A abutting a flattened part on the hub portion D'.

As shown in the drawings, the cutting-disk is journaled on its bearing-ring E through the medium of antifriction-balls F F. To accommodate said balls and prevent frictional contact thereof with the faces of the stationary disk-like parts or hub portions D D, said parts are preferably provided with annular confronting grooves or depressions $d\ d$, which inclose the annular series of balls between them, and the balls are preferably held in proper bearing position and at suitable distances apart by means of a spacing-ring G, which is provided with a series of apertures $g\ g$ to receive the balls. This spacing-ring may rest in annular grooves $d'\ d'$ in the faces of the parts D D or be otherwise secured in place. By this arrangement the number of balls employed is reduced, frictional contact between the balls prevented, and the disk made to rotate on a very small number of bearing-points, thus reducing the friction to a minimum. In place of the spacing-ring G any suitable ball retainer and separator may be employed, so as to retain as well as separate the balls, though the construction described is simple and desirable. The spacing-ring may of course be dispensed with, if desired, as also the annular grooves or depressions $d\ d$, and the series of balls held in place by the confronting faces of the disk-like parts D D.

A modification of the antifriction devices and the spacing-ring is illustrated in Figs. 5 and 6, wherein antifriction-rollers H H are substituted for the balls F F, and said rollers are held in place and suitably spaced by means of a ring I, which is a retainer and separator, being provided with confronting teats or protuberances $i\ i$, which are bent or otherwise fitted into suitable depressions $h\ h$ in the ends of the rollers. Said rollers and their retainers are designed to be placed around the bearing ring or annulus E between the parts D D, the same as the balls F and ring G.

I thus provide an efficient rolling colter having a practically-frictionless bearing, and by the absence of any rotating part, except the cutting-disk, the objection incident to the use of devices of this class, of grass and weeds wrapping around the hub and axle and clogging the colter, is overcome. Moreover, the device is simple and inexpensive, and the parts may be easily taken apart or put together and secured between the yoke-arms by means of the single fastening-bolt, while the non-rotating hub serves to effectually exclude dirt and dust from the cutter-bearings and to sustain the cutting-disk in proper operative position, while permitting free rotation thereof on its bearings.

It may be desirable in practice to place a washer at either or both sides of the bearing-ring E, between said ring and the non-rotating hub section or sections, so that either or both washers may be removed to compensate for any wear between the cutting-disk and the disk-like portions of the non-rotating hub.

The colter is susceptible of various modifications in construction, of course, without departing from the spirit or scope of the invention.

Having thus fully described my invention, what I claim as new, and desire to secure by Letters Patent of the United States, is—

1. A rolling colter comprising a non-rotating hub composed of separable parts and a rotary cutting-disk having the form of an annulus with a cutting edge confined between said parts and having a bearing centrally thereof around their inner adjoining ends to permit free rotation of the disk, substantially as described.

2. A rolling colter comprising a non-rotating hub composed of separable parts, and an interposed rotary cutting-disk in the form of an annulus having a bearing centrally of said parts to permit free rotation of the disk, together with means for securing the parts of the hub together and rotatively confining the disk between them, substantially as described.

3. A rolling colter comprising a non-rotating hub composed of separable parts having a centrally-apertured cutting-disk loosely confined between the same, a stationary bearing-ring or annular bearing-surface concentric with the disk and within the aperture therein, and a series of antifriction devices encircling said annular bearing-surface on which the apertured portion of the disk has its bearings, substantially as described.

4. In a rolling colter, the combination of the centrally-apertured cutting-disk, a bearing-ring therefor, suitable antifriction devices interposed between said disk and bearing-ring, and non-rotative elements secured on opposite sides of said bearing-ring having confronting disk-like portions which sustain the cutting-disk rotatively on its bearings between them and prevent the entrance of dust and dirt to the bearings; substantially as described.

5. In a rolling colter, the combination of a centrally-apertured cutting-disk, a bearing-ring therefor, suitable antifriction devices between said ring and disk, an interposed spacing-ring for holding said antifriction devices in proper position and at suitable distances apart, and non-rotative elements secured on opposite sides of said bearing-ring which guide the cutting-disk between their confronting faces so as to permit free rotation thereof on its bearings; substantially as described.

6. In a rolling colter, the combination of a centrally-apertured cutting-disk, a bearing-ring therefor, an annular series of antifriction devices interposed between said ring and disk, non-rotative elements secured on opposite sides of said bearing-ring having disk-like portions which guide the cutting-disk rotatively between their confronting faces, said disk-like portions being formed with confronting annular grooves which inclose said annular series of antifriction devices; substantially as described.

7. In a rolling colter, the combination of a centrally-apertured cutting-disk, a bearing-ring therefor, antifriction-balls interposed between said disk and bearing-ring, and a spacing-ring for spacing and holding said balls in position, stationary hub-like portions secured on opposite sides of said bearing-ring having confronting flanges which cover the bearings and guide the rotary cutting-disk between them, and means for securing the ball-spacing ring in position to hold the balls in proper alinement between said flanges; substantially as described.

8. In combination with the hub composed of separable parts or hub-sections and the cutting-disk rotatively confined between said hub-sections, the yoke having a lug thereon abutting the surface of one of said hub-sections to prevent the latter from turning, substantially as described.

In testimony whereof I affix my signature in presence of two witnesses.

CHARLES H. MELVIN.

Witnesses:
WM. BUTTERWORTH,
LYSTER J. CHAMBERS.